United States Patent [19]

Adler

[11] 3,723,919

[45] Mar. 27, 1973

[54] ACOUSTIC SURFACE WAVE FILTERS WITH REFLECTION SUPPRESSION

[75] Inventor: Robert Adler, Northfield, Ill.

[73] Assignee: Zenith Radio Corporation, Chicago, Ill.

[22] Filed: Mar. 20, 1972

[21] Appl. No.: 235,990

[52] U.S. Cl. ....................333/72, 333/30 R, 310/9.7, 310/9.8

[51] Int. Cl. ............................H03h 9/20, H03h 9/30

[58] Field of Search..........333/72, 30 R; 310/9.7, 9.8

[56] References Cited

UNITED STATES PATENTS

| | | | |
|---|---|---|---|
| 3,310,761 | 3/1967 | Brauer | 333/30 R |
| 3,609,416 | 9/1971 | Epstein | 333/30 R X |
| 3,662,293 | 5/1972 | De Vries | 333/30 R |
| 3,675,054 | 7/1972 | Jones et al. | 333/72 X |
| 3,686,518 | 8/1972 | Hartmann | 333/72 X |

*Primary Examiner*—Herman Karl Saalbach
*Assistant Examiner*—Hugh D. Jaeger
*Attorney*—John J. Pederson et al.

[57] ABSTRACT

A surface-wave integratable filter includes an input transducer for launching acoustic surface waves along a path in a propagating medium. An output transducer responds to those surface waves by developing output signals. One or both transducers takes the form of an iterative series of conductive ribbons disposed laterally across the path. The ribbons are spaced apart by a distance of one-fourth the wavelength of the acoustic energy. A first source or load is connected exclusively across one of a first pair of successive ribbons and one of an adjacent pair of successive ribbons. A second source or load similarly is connected exclusively across the others of the ribbons in those first and second pairs. The center-to-center distance between the ribbons across which each source or load is connected is one-half the acoustic wavelength.

4 Claims, 3 Drawing Figures

ACOUSTIC SURFACE WAVE FILTERS WITH REFLECTION SUPPRESSION

BACKGROUND OF THE INVENTION

The present invention pertains to surface wave integratable filters that have come to be known by the term SWIFS. More particularly, it relates to the reduction of spurious reflection signals that otherwise would result in undesired components in the output from a SWIF.

It has been known that an electrode array composed of a pair of interleaved combs of conducting teeth at alternating potentials, when coupled to a piezoelectric medium, produces acoustic surface waves on the medium. In a simplified embodiment of a water poled perpendicularly to the propagating surface, the waves travel at right angles to the teeth. The surface waves are converted back into electrical signals by a similar array of conductive teeth coupled to the piezoelectric medium and spaced from the input electrode array. In principle, the tooth pattern is analogous to an antenna array. Consequently, similar signal selectivity is possible, thereby eliminating the need for the critical or much larger and more cumbersome components normally associated with frequency selective circuitry. Thus, such a device, with its small size, is particularly useful in conjunction with solid-state functional integrated circuitry where signal selectivity is desired. A number of different versions of these SWIF devices, together with various modifications and adjustments thereof, are described and others are cross-referenced in U.S. Pat. No. 3,582,840 issued June 1, 1971 and assigned to the same assignee as the present application.

The usual SWIF has a finite distance between its input and output transducers. Hence, a finite time is required for an acoustic surface wave to travel along the path from the input transducer to the output transducer. At that output transducer, part of the acoustic wave energy is converted to electrical energy and delivered to a load. Another part of the acoustic wave energy is transmitted past the output transducer where it may be terminated or dissipated. A still further part of the arriving acoustic wave energy is reflected back along the original path toward the input transducer. This reflected surface wave, which is identical in frequency range to the original surface wave but smaller in magnitude, intercepts the input transducer from which a portion of the wave again is similarly reflected back along the same path to the output transducer where it appears as a diminished replica of the original surface-wave. Because of the additional distance of travel, this smaller version of the original surface-wave arrives at the output transducer later that that original wave. The time delay is equal to twice the time required for a surface-wave to transverse the path from the input transducer to the output transducer. When such a SWIF is used, for example, as a signal-selective device in a television intermediate-frequency amplifier, the triple transit reflected signal components appear as ghosts in the picture and make it highly undesirable, if not completely unacceptable, for normal viewing.

Known methods for approaching this problem have included optimizing the signal-transducing characteristics of one or both of the input and the output transducers, depositing an attenuating material between the input and output transducers, reducing the time delay be decreasing the spacing between the transducers, and utilizing an additional transducer, spaced from the input and output transducers, responsive to a portion of the original surface wave for generating a still additional acoustic surface wave that at least partially counteracts the undesired acoustic wave originally reflected back from the output transducer. While this last-mentioned technique is an improvement over the first-mentioned approaches, it is basically a cancellation scheme in which one undesired component is cancelled by another. The amount of improvement available is limited and more substrate space is required.

An improvement in the latter respect is disclosed and claimed in the concurrently filed application of Adrian J. DeVries, Ser. No. 235,991, filed Mar. 20, 1972, and assigned to the same assignee as the present application. In that approach, what usually are unitary "teeth" of the interleaved electrode combs are subdivided into ribbon pairs wherein the individual ribbons are spaced apart by one-fourth wavelength. The result is to reduce reflection components arising because of mechanical loading of the substrate by the conductive elements of the transducer and local electric field shorting caused by those elements. However, other reflection components remain which are caused by what may be termed electrical loading of the substrate.

It is an object of the present invention to provide a new and improved acoustic-wave transmitting device which implements the improvement forthcoming from the aforesaid DeVries contribution while at the same time also reducing reflection components that otherwise would arise by reason of electrical loading.

An acoustic-wave transmitting device constructed in accordance with the present invention, therefore, includes an acoustic-wave-propagating medium. A first transducer responds to input signals for launching along a predetermined path in the medium desired acoustic surface waves which exhibit a predetermined wavelength. A second transducer responds to those desired acoustic waves by developing output signals. At the same time, the second transducer would also respond to spurious acoustic-surface waves also of the same wavelength in the medium by developing undesired output signal components. As an improvement in at least one of the transducers, it is composed of an iterative series of conductive ribbons that are individually disposed on the medium across the wave-propagation path. Moreover, the ribbons are laterally spaced one from the next by a center-to-center distance of one-fourth the predetermined wavelength. First signal components are coupled exclusively across one of a first pair of successive ribbons and one of an adjacent pair of successive ribbons with the center-to-center distance between the one ribbons being one-half the predetermined wavelength. Finally, second signal components are exclusively coupled across the others of the ribbons in those first and second pairs with the center-to-center distance between these other ribbons also being one-half the predetermined wavelength.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figures 1, 2:
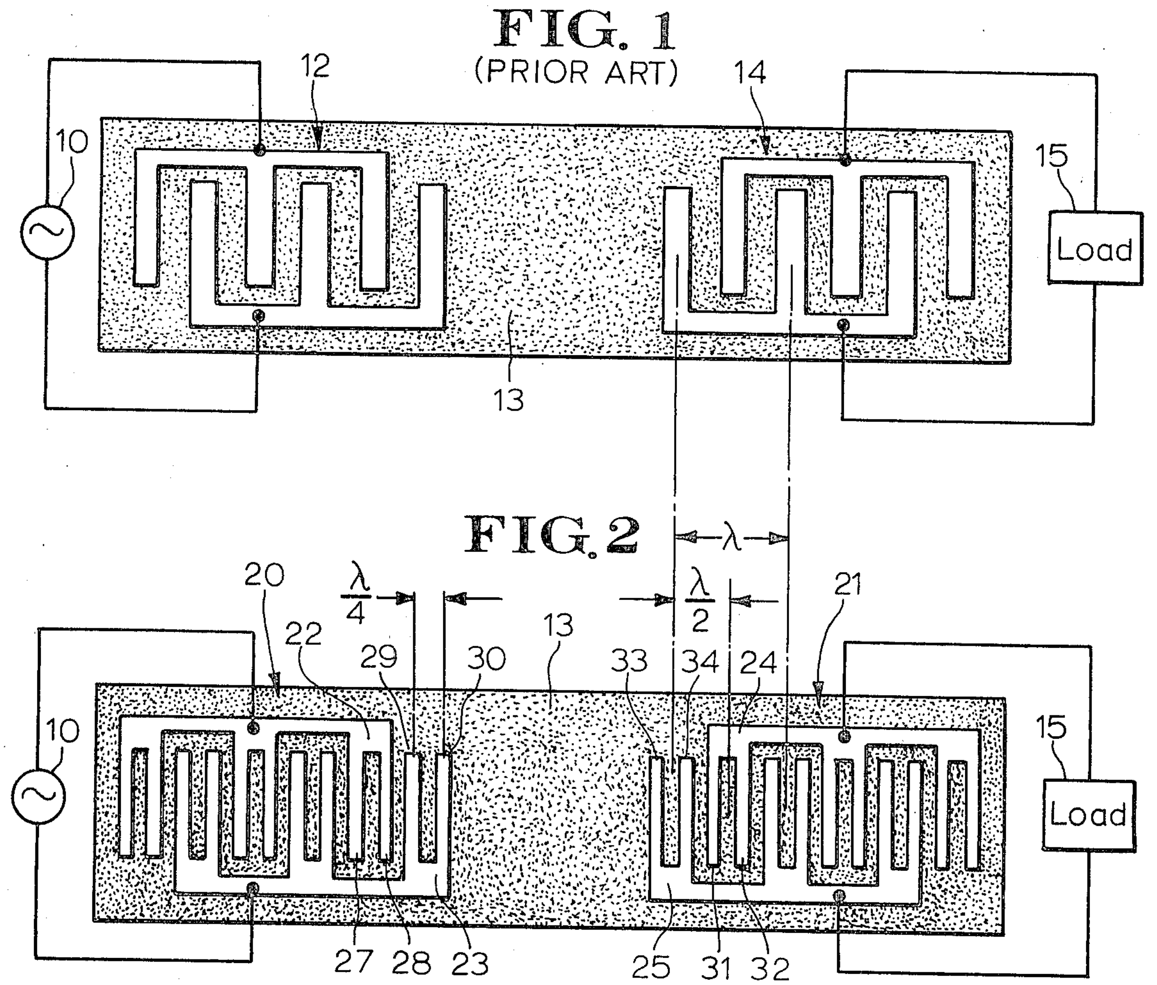
FIG. 1 is a partly schematic plan view of a now-known acoustic-wave transmitting device.
FIG. 2 is a partly-schematic plant view of such a device as improved in accordance with the aforesaid DeVries application.

In FIG. 1, an input signal source 10 is connected across an electrode array 12 which is mechanically coupled to a piezoelectric acoustic-wave-propagating medium or substrate 13 to constitute therewith an input transducer. An output electrode array 14 is also mechanically coupled to substrate 13 to constitute therewith an output transducer. Electrode arrays 12 and 14 are each constructed in two interleaved comb-type electrodes of a conductive material, such as gold or aluminum, which may be vacuum deposited on the smoothly-lapped and polished planar upper surface of substrate 13. The piezoelectric material is one, such as PZT or lithium niobate, that propagates acoustic surface waves.

In operation, direct piezoelectric surface-wave transduction is accomplished by input transducer 12. Periodic electric fields are produced across the comb array when a signal from source 10 is applied to the electrodes. These fields cause perturbations or deformations of the surface of substrate 13 by piezoelectric action. Efficient generation of surface waves occurs when the strain components produced by the electric fields in the piezoelectric substrate substantially match the strain components associated with the surface-wave mode. These mechanical perturbations travel along the surface of substrate 13 as generalized surface waves representative of the input signal.

Source 10 might, for example, be the radio-frequency portion of a television receiver tuner that produces a range of signal frequencies. However, due to the selective nature of transducer 12 and 14, only a particular frequency and its intelligence-carrying sidebands are converted to surface waves. Those surface waves are transmitted along the substrate to output transducer 14 where they are converted to an electrical signal for transmission to a load 15 connected across the two interleaved combs in output transducer 14. In this example, load 15 represents a subsequent radio-frequency input stage of the turner such as the heterodyne converter which downshifts the signal frequency to an intermediate frequency. Utilizing lithium niobate as the substrate material in the example, the teeth of both transducers 12 and 14 are each about four microns wide and are separated by a center-to-center spacing of eight microns for the application of a radio-frequency signal in standard program channel 13 within which the video carrier is located at 211.25 mHz. The spacing between transducer 12 and transducer 14 is on the order of 60 mils and the width of the wavefront is approximately 0.1 inch.

The potential developed between any given pair of successive teeth in electrode array 12 produces two waves travelling along the surface of substrate 13, in opposing directions, perpendicular to the teeth for the illustrative case of a substrate which is poled perpendicularly to the surface. When the center-to-center distance between the teeth is one-half of the acoustic wavelength of the wave at the desired input signal frequency, the so-called center or synchronous frequency, relative maxima of the output waves are produced by piezoelectric transduction in transducer 12. For increased selectivity, additional electrode teeth are added to the comb patterns of transducers 12 and 14. Further modifications and adjustments are described and others are cross-referenced in the aforementioned Letters Patent for the purpose of particularly shaping the response presented by the filter to the transmitted signal. Techniques are also there mentioned for attenuating or advantageously making use of the one of the two surface waves that travels to the left from transducer 12 in FIG. 1. It will suffice for purposes of understanding the present invention to consider only the acoustic surface waves that travel to the right from transducer 12 in the direction toward transducer 14.

As mentioned in the introduction, not all of the acoustic energy arriving at transducer 14 is converted to electrical energy. Part of the acoustic energy is reflected back along the original path. That is, when the surface wave travelling to the right from input transducer 12 intercepts output transducer array 14, a reflected surface wave is created. The reflected surface wave travels along a return path where a portion again is similarly reflected back in a third transit along the propagating medium toward output transducer 14. Consequently, a diminished replica of the original surface waves arrives at the output transducer later than than original wave. The time delay of the diminished replica is equal to twice the amount of time required for a surface wave to traverse the path initially from the input transducer to the output transducer. It is this diminished replica that constitutes spurious acoustic-surface-wave energy and, without more, produces undesired output signal components such as the aforementioned "ghosts."

To the end of reducing the development of such reflected energy, the fingers or teeth of the interleaved conductive combs in the transducers of the embodiment of FIG. 2 are physically subdivided. The device of FIG. 2 includes an input transducer 20 and an output transducer 21. Input transducer 20 is composed of a apir of interleaved combs 22 and 23 of conductive material. Similarly, output transducer 21 is composed of a pair of interleaved combs 24 and 25.

In the drawing, transducers 20 and 21 of FIG. 2 are intended to exhibit maximum response at the same frequency as the respective transducers 12 and 14 in FIG. 1. Thus, the effective interdigital tooth spacing is the same in both figures. However, in the FIG. 2 version that which corresponds to a single finger or tooth in a transducer of FIG. 1 is subdivided or separated into an adjacent pair of successive ribbons. That is, each "-tooth" of comb 22 is subdivided into a pair of ribbons 27 and 28, while each such "tooth" of interleaved comb 23 is similarly subdivided into a pair of ribbons 29 and 30. Similarly in output transducer 21, each "-tooth" of comb 24 is subdivided into a pair of ribbons 31 and 32, while each "tooth" of comb 25 is likewise subdivided into a pair of ribbons 33 and 34.

As indicated on the drawing, the individual different ribbons are spaced one from the next by a center-to-center distance of one-fourth the acoustic wavelength in substrate 13 at the desired frequency of maximum response. Source 10 and load 15 are coupled across adjacent pairs of the successive ribbons. Moreover, the center-to-center distance between all such adjacent pairs is one-half the acoustic wavelength. Further, the center-to-center spacing between each two adjacent sets of ribbon pairs on the same comb is one acoustic wavelength. By comparison of FIGS. 1 and 2, it will be observed that, as between the two combs in each transducer, the repetitive distance is the same in both figures. As a result, the frequencies of maximum response are the same, as already indicated. However, the subdivisions of the otherwise individual "teeth" in transducers 20 and 21 and the effective quarter-wavelength spacing between the subdivisions yield cancellations of reflected waves.

Perhaps to better understand the principles involved, reference may again be had to FIG. 1. A wave approaching transducer 14 has a first portion reflected by the first transducer tooth encountered. Another portion is similarly reflected by the second tooth encountered. These reflections arise because each tooth mechanically loads the substrate and also because each tooth locally shorts the directly underlying electric fields. Noting that there is a half-wavelength spacing between those two teeth, the portion of the original wave that travels past the first tooth and on to the second tooth and then is reflected backwardly once again to the first tooth will be seen to have travelled an additional total of one wavelength. Thus, both reflected portions leaving the first tooth back toward transducer 12 are in phase and thereby augment one another. While both calculations and experimentations above have shown that the magnitude of the reflections is affected to some extent by the impedance of the connected load, such studies also reveal that the reflection coefficient is substantial throughout the passband of desired response for all possible load conditions.

Returning to FIG. 2, a portion of an acoustic wave arriving at transducer 21 from transducer 20 is reflected by ribbon 33. Another portion of that same wave subsequently is reflected by ribbon 34. In travelling from ribbon 33 to ribbon 34 and back, that second portion in this case has travelled one-half additional wavelength. Accordingly, on leaving transducer 21 and travelling on back toward transducer 20, the wave portion reflected from ribbon 34 is displaced in phase by 180° relative to the wave portion directly reflected from ribbon 33. Therefore, these two different portions tend to cancel one another. As a result, the total amount of reflected energy in the device is reduced. Moreover, and as detailed more fully in the aforementioned DeVries application, the load (or source) impedance connected to the transducer preferably is significantly lower than the impedance presented by the transducer itself. While this reduces the amount of power transfer, it desirably effects a substantial decrease in the reflection coefficient of the transducer.

To the extend that substantial reflection cancellation is in this manner achieved by the subdivision of the "-teeth" in transducer 21, it is unnecessary to employ the improvement in the input transducer. That is, transducer 12 of FIG. 1 may be substituted for transducer 20 of FIG. 2. Where desired, however, both the input and output transducer may be of the subdivided form. Any lack of complete reflection cancellation at the output transducer then is attended by a further degree of cancellation on re-reflection from the input transducer back toward the output transducer. In passing, it may be noted that the width of the individual ribbons in transducers 20 and 21 as shown is nominally one-eighth acoustic wavelength. However, this particular dimension is not critical. In operation, the frequency response is approximately the same for the devices of FIGS. 1 and 2 around the fundamental frequency. At harmonics of that frequency, however, differences in the response characteristic will be encountered.

The embodiment of FIG. 2 has also been described and is claimed in the previously mentioned DeVries application. It has been included in the present application in order to illustrate as a separate matter certain aspects of reflected-wave cancellation that also are achieved in the improved embodiment of FIG. 3. In connection with the operation of FIG. 2, it has been determined that those reflections which are cancelled as a result of utilizing the quarter-wavelength-spaced ribbons are caused by mechanical loading of the surface of substrate 12 by the conductive elements of the transducer and by localized shorting of electric fields under those elements. While the embodiment of FIG. 2, therefore, does thereby result in an improvement through the reduction of reflected waves occasioned by mechanical loading and local field shorting, still additional reflected wave components arise by reason of electrical shorting of a section of the piezoelectric material over the width of each "tooth." This effect is related to the finite impedance presented by the connected external input or output stage. In transducers 20 and 21 in FIG. 2, each of the successive ribbons in each ribbon pair, such as ribbons 33 and 34, are electrically connected so that an extended short exists over better than a quarter wavelength.

Figure 3:
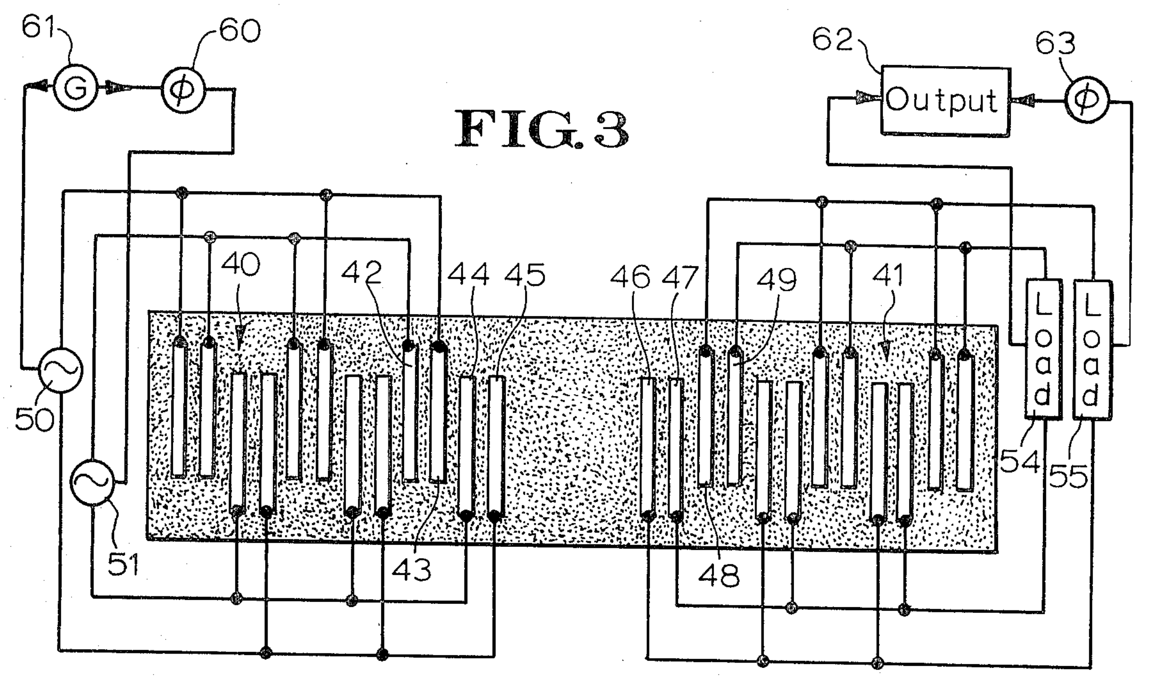
FIG. 3 is a partly schematic plan view of an embodiment constructed in accordance with the present invention.

To the end of also reducing reflection components arising by reason of the existence of intro-"tooth" shorting in the surface of substrate 13, the construction of the embodiment of FIG. 3 is such as to separate electrically what effectively are the two different segments of each original "tooth." Thus, the device of FIG. 3 includes an input transducer 40 and an output transducer 41. Input transducer 40 is composed of an iterative series of conductive ribbons such as ribbons 43 and 43 constituting one pair of ribbons 44 and 45 constituting another pair. Output transducer 41 includes a first pair of ribbons 46 and 47 and a second pair of ribbons 48 and 49. All of the individual different ribbons are again individually disposed across the wave-propagation path and are laterally spaced one from the next by a center-to-center distance of one-fourth the acoustic wavelength for which the transducers exhibit maximum response.

In order electrically to separate the different ribbon pairs, correspondingly separate input sources and loads are employed. Thus, the device of FIG. 3 is associated with a first input source 50 and a second input source 51. Source 51 is connected exclusively across one ribbon of each successive ribbon pair and the corresponding one ribbon of each adjacent successive ribbon pair;

that is, source 51 is, for example, coupled across ribbons 42 and 44. Complementally, source 50 is coupled exclusively across the others of the ribbons in the adjacent pairs of successive ribbons; that is, source 50 is connected between ribbons 43 and 45. As shown on the drawing, sources 50 and 51 correspondingly are connected to the respective different individual ribbons of the other ribbon pairs in transducer 40. Analogously, output transducer 41 is associated with a pair of loads 54 and 55. Load 54 is connected across ribbons 47 and 49, while load 55 is connected between ribbons 46 and 48. Both loads 54 and 55 are also connected across the corresponding different ribbons in the other ribbon pairs. That is, load 54 is coupled across one of the successive ribbons in each of the adjacent ribbon pairs and load 55 is coupled across the other of the ribbons in those pairs.

Again to the extent that sufficient reflection compensation is obtained by the combination of electrode subdivision and electrical separation in output transducer 41, the same technique need not be employed in connection with input transducer 40 and the simpler input transducer 12 of FIG. 1 may then be substituted. When however, the subdivided and electrically separated electrode approach of input transducer 40 is utilized, it is desirable to include a phase shifter 60 in combination with one of the two input signal sources 50 and 51 and to drive both sources from a common signal generator 62. Shifter 60 changes the phase of one input signal by 90° relative to the other in correspondence with the quarter-wavelength spatial separation of each two ribbons, such as ribbons 42 and 43, which, in turn, correspond to a single "tooth" in the frame of reference of the unitary-tooth transducer construction of FIG. 1. In this case, then, phase shifter 60 is specifically connected in series between generator 61 and source 51. Of course, the frequencies of the signals from sources 50 and 51 remain the same, and those two sources take the form of isolating or buffer amplifiers in order to achieve the necessary electrical separation. Analogously, the signals from loads 54 and 55 ultimately may be combined in a single output device 62 after transmission through loads 54 and 55 which take the form of respective isolation or buffer stages in order to maintain electrical separation as seen by transducer 41. Another 90° phase shifter 63 is then included, in the case specifically in series between load 55 and output device 62.

As drawn in FIG. 3, the different ribbon pairs have been staggered in terms of one with respect to the next. From the standpoint of visualization, this may have enabled more ready identification of the different pairs that correspond with the respective subdivided "teeth" in the FIG. 2 version. In practice, however, such staggering is unnecessary,and even undesirable insofar as it wastes conductive materials. Thus, the ends of all the different ribbons preferably may be aligned in actual construction.

In operation of the device of FIG. 3, reflection components due to mechanical loading and local shorting of the substrate by the transducer are cancelled in the same manner already as explained in connection with the embodiment of FIG. 2. In addition, the arrangement of FIG. 3 avoids additional reflection components that otherwise would arise by reason of electrical shorting between two successive conductive ribbons of a region of a quarter-wavelength or slightly more. By reason of the quarter-wavelength between each two successive ribbons, the coupled loads are effectively in spatial quadrature, and it is that total configuration which results in the non-reflective character of the total electrical load.

An alternative embodiment, which constitutes a different approach to improvement upon the embodiment of FIG. 2, is described and claimed in the concurrently filed, copending application of Thomas J. Wojcik, Ser. No. 238,544, filed Mar. 27, 1972 and also assigned to the same assignee as the present application.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. In an acoustic-wave transmitting device having an acoustic-wave-propagating medium, a first transducer responsive to input signals for launching along a predetermined path in said medium desired acoustic surface waves exhibiting a predetermined wavelength and a second transducer responsive to said desired acoustic waves for developing output signals and also responsive to spurious acoustic-surface waves also of said wavelength in said medium for developing undesired output signal components, the improvement in at least one of said transducers comprising:

an iterative series of conductive ribbons individually disposed across said path and laterally spaced one from the next by a center-to-center distance of one-fourth said predetermined wavelength;

means for coupling first signal components exclusively across one of a first pair of successive ribbons and one of an adjacent pair of successive ribbons with the center-to-center distance between said pairs being one-half said predetermined wavelength;

and means for coupling second signal components exclusively across the other of said ribbons in said first and second pairs with the center-to-center distance between said other ribbons also being one-half said predetermined wavelength.

2. A device as defined in claim 1 in which said first-signal-component coupling means includes a first load coupled across said one ribbons, and said second-signal-component coupled means includes a second load coupled across said other ribbons.

3. A device as defined in claim 2 which further comprises means, including means for shifting the phase of one of said first and second signal components by $\pi/2$ radians, for combining the signals in said first and second loads.

4. A device as defined in claim 1 in which said first-signal-component coupling means includes a first source of signals of predetermined frequency coupled across said one ribbons, and said second-signal-component coupling means includes a second source of signals, also of said predetermined frequency but shifted in phase by $\pi/2$ radians relative to the signals from said first source, coupled across said other ribbons.

* * * * *

Disclaimer 3,723,919.—*Robert Adler*, Northfield, Ill. ACOUSTIC SURFACE WAVE FILTERS WITH REFLECTION SUPPRESSION. Patent dated Mar. 27, 1973. Disclaimer filed Oct. 12, 1973, by the assignee, *Zenith Radio Corporation*.

Hereby enters this disclaimer to claims 1–4 of said patent.

[*Official Gazette November 13, 1973.*]